US006808800B2

United States Patent
Tomasi

(10) Patent No.: US 6,808,800 B2
(45) Date of Patent: Oct. 26, 2004

(54) RIGID POLYURETHANE FOAM AND HEAT INSULATING CONSTRUCTION ELEMENT COMPRISING THE SAME

(75) Inventor: Giampaolo Tomasi, Piazzola sul Brenta (IT)

(73) Assignee: Sixton Holdings S.A., Luxembourg (LU)

( * ) Notice: Subject to any disclaimer, the term of this patent is extended or adjusted under 35 U.S.C. 154(b) by 0 days.

(21) Appl. No.: 09/800,588

(22) Filed: Mar. 8, 2001

(65) Prior Publication Data

US 2001/0014387 A1 Aug. 16, 2001

Related U.S. Application Data

(63) Continuation of application No. PCT/IT99/00156, filed on Jun. 2, 1999.

(30) Foreign Application Priority Data

Sep. 14, 1998 (IT) ........................................ PD98A00215

(51) Int. Cl.$^7$ ................................ B32B 3/26; C08J 9/00
(52) U.S. Cl. ................................ 428/314.4; 428/319.1; 428/319.3; 428/353; 428/423.1; 521/128; 521/130; 521/172; 521/115; 521/163
(58) Field of Search ..................... 521/163, 130, 521/172, 115, 128; 428/314.4, 314.8, 319.1, 423.1, 319.3, 353

(56) References Cited

U.S. PATENT DOCUMENTS 3,431,223 A   3/1969 Reymore, Jr. et al. ....... 260/2.5
4,071,482 A * 1/1978 Hopkins et al. ............. 521/130
4,328,322 A * 5/1982 Baron ......................... 521/163
5,102,923 A   4/1992 Porosoff et al. ............. 521/159
5,185,383 A * 2/1993 Regenauer ................... 521/155
5,380,768 A * 1/1995 Cranston et al. ............. 521/167
6,020,392 A * 2/2000 Kushner et al. ............. 521/163

FOREIGN PATENT DOCUMENTS

EP   0 445 411 A2   9/1991
EP   0 650 991 A1   5/1995
EP   0 716 107 A2   6/1996

\* cited by examiner

Primary Examiner—Terrel Morris
Assistant Examiner—Hai Vo
(74) Attorney, Agent, or Firm—Finnegan, Henderson, Farabow, Garrett & Dunner, LLP

(57) ABSTRACT

A rigid polyurethane foam is described which is preferably, while not exclusively, used for manufacturing composite building elements used in buildings or for manufacturing industrial constructions. The foam has a structure consisting of closed cells substantially free therein of optionally halogenated hydrocarbon foaming agents, having an adhesion strength to a supporting substrate, measured according to standards EN 1607, equal to or higher than 0.7 kg/cm$^2$. The polyurethane foam may be obtained starting from at least one polyol and at least one isocyanate compound by using a water-based foaming agent entirely compatible with the strictest environmental requirements, and has good mechanical characteristics, characteristics of dimensional stability, characteristics of adhesion to a supporting substrate and, possibly, characteristics of fire resistance.

25 Claims, No Drawings

RIGID POLYURETHANE FOAM AND HEAT INSULATING CONSTRUCTION ELEMENT COMPRISING THE SAME

This application is a continuation of international application number PCT/IT99/00156, filed Jun. 2, 1999 and claims priority of Italian Patent Application No. PD98A000215, filed Sep. 14, 1998, the content of both of which is incorporated herein by reference.

DESCRIPTION

1. Technical Field

According to a first aspect thereof, the present invention relates to a rigid polyurethane foam preferably, while not exclusively, used for manufacturing composite building elements used in buildings or for manufacturing industrial constructions.

According to a second aspect thereof, the present invention relates to heat insulating building elements which incorporate or are coated with said foam, such us for instance composite panels for manufacturing ducts for heat ventilation and conditioning plants, curtain walls, elements for manufacturing civil or industrial roofing of the type used for buildings, heat insulating elements, such as for instance walls for cold-storage benches or rooms, or the same walls for civil or industrial constructions, suitably coated with said foam.

According to a further aspect thereof, the present invention also relates to a process for producing the aforementioned building elements.

2. Prior Art

As is known, rigid polyurethane foams are expanded polymers produced by a polyaddition mechanism between one or more compounds comprising two or more hydroxyl groups (such as, for instance, polyols) with one or more compounds comprising two or more isocyanate groups in the presence of a suitable foaming agent, whose presence is required to obtain the desired good heat insulating properties thanks to the formation of a foamed structure consisting of substantially closed cells.

Together with these properties, the rigid polyurethane foam should possess at the same time suitable adhesion characteristics to the supporting substrate(s) which constitute the building element to be manufactured, good mechanical characteristics, such as for instance low friability, low heat conductivity and, if so desired for the specific application, also good characteristics of dimensional stability on temperature changes, and/or of fire resistance.

The combination of these characteristics has been obtained for many years by using as foaming agent a class of halogenated hydrocarbons, namely chlorofluorocarbons (CFC), which however have been recently indicated by different parts as being the main cause of the progressive erosion of the ozone layer that protects earth atmosphere by the harmful UV-rays.

Because of the outlawing of CFCs due to their ozone depletion potential, the use of alternative foaming agents was proposed, among which some hydrocarbons have recently widespread in the practice, such as for instance n-pentane or cyclopentane, and hydrochlorofluorocarbons (HCFC) having an ozone depletion potential lower than CFCs'.

However, the use of such alternative foaming agents involves application limits which have not been overcome to date Hydrocarbon foaming agents, in fact, while being, on the one hand easily adaptable to the existing foaming plants, on the other hand, are highly flammable and, in certain concentrations, apt to form explosive mixtures, which cause their use to be possible only with the adopt ion of strict safety measures, and only in some applications. So, for instance, the use of hydrocarbon foaming agents may be scarcely adopted in the practice for manufacturing composite panels wherein foam is interposed, as in a sandwich, between two metal sheets, since the sparks caused by cutting and shaping operations of the same might trigger dangerous combustion phenomena of the hydrocarbon trapped in the cellular structure of the foam.

Besides, the foams obtained by using hydrocarbon foaming agents show poor heat insulating characteristics in all those applications wherein heat insulation is an important parameter.

The use of hydrochlorofluorocarbon-based (HCFC) foaming agents, suitable per se to impart to the polyurethane foam the desired mechanical, adhesion, dimensional stability and heat insulation characteristics was, on the contrary, limited by the reduced commercial availability of these compounds, by their high cost and, not the least, by the approaching of the term beyond which also these halogenated hydrocarbons will not be utilizable any longer for environmental reasons.

In order to obviate this situation, it was attempted to use water as foaming agent, thanks to the presence in its molecule of hydrogen atoms having an acid character and, as such, capable of reacting with the isocyanate compound.

More particularly, water reacts with the isocyanate compound according to a multi-step reaction mechanism during which an unstable carbamic acid is formed which in turn decomposes, forming in the reaction medium gaseous carbon anhydride (which acts as the real foaming agent formed in situ) and an amine which, in turn, reacts with other isocyanate groups, leading to the formation of a compound including a disubstituted urea group.

However, the attempts made till now to use water as foaming agent, use which is certainly desirable due to reduced cost and practically unlimited availability of water, were disappointing.

In fact, it was experimentally found that by using water as foaming agent, the resulting foam is friable, dimensionally unstable on temperature changes, and, above all, has insufficient of adhesion characteristics to its supporting substrate.

SUMMARY OF THE INVENTION

The technical problem underlying the present invention is that of providing an improved rigid polyurethane foam which allows to overcome the limitations reported above with reference to the cited prior art.

According to a first aspect of the invention, the aforementioned problem is solved by a rigid polyurethane foam comprising a foamed structure consisting of closed cells substantially free therein of optionally halogenated hydrocarbon foaming agents, and having an adhesion strength to a supporting substrate, measured according to standards EN 1607, equal to or higher than 0.7 kg/cm$^2$.

In the following description and in the appended claims, the terms: "foam consisting of closed cells substantially free therein of hydrocarbon foaming agents" is used to indicate a foam wherein no appreciable amounts of hydrocarbon foaming agents are found as such, nor possible residues originating by their use to carry out the expansion of the same foam.

DETAILED DESCRIPTION OF THE PREFERRED EMBODIMENTS OF THE INVENTION

The polyurethane foam of the invention is essentially constituted by a two-phase system, one of which, namely a solid phase, comprises a foamed structure consisting of closed cells forming a "honeycomb" structure, and the other, a gaseous phase, originating from the foaming agent which, in the case of the invention, is substantially free from optionally halogenated hydrocarbons or residues thereof, but preferably comprises $CO_2$ or air originating from the use of a non organic foaming agent such as, for instance, water.

The foamed structure of the polyurethane foam of the invention, furthermore, has a percentage of closed cells preferably higher than 90% and falls within the class of the so-called rigid polyurethane foams.

Preferably, the polyurethane foam of the invention has a percent linear dimensional variation, measured according to standards EN 1604, between a minimum temperature of −25° C. and a maximum temperature of 70° C., not higher than 4%.

Such a feature renders the foam particularly suitable for all those applications, such as for instance for producing building panels or manufacturing ducts for heat ventilation or conditioning plants, wherein a good dimensional stability on temperature changes is required.

Preferably, the polyurethane foam of the invention has a friability, measured as percent weight loss according to standards ASTM C421, not higher than 3%.

Such a feature renders the foam particularly suitable for all those applications, such as for instance for forming coating layers used for building, wherein a good resistance to impact with outer bodies is required.

Preferably, the polyurethane foam of the invention has a heat conductivity, measured according to standards ISO 6902, of from 0.024 to 0.028 W/m° C., so as to impart to the building element that incorporates the same good heat insulating features.

For the purposes of the invention, the desired high level of rigidity of the closed cell structure of the polyurethane foam may be obtained by reacting with one another at least one polyester and/or polyether polyol having an average functionality (i.e., the number of OH groups per molecule) of from 2.5 to 8 with at least one isocyanate compound having an average functionality (i.e., the number of —NCO groups per molecule) of from 2.5 to 3.

More particularly, the polyurethane foam of the invention may be obtained by submitting to reaction and simultaneous foaming a mixture of ingredients comprising per 100 parts by weight of the same:

from 10 to 25 parts of at least one polyester polyol having a minimum functionality equal to 2 and a hydroxyl number of from 250 to 600;

from 50 to 65 parts of at least one isocyanate compound;

from 1 to 2 parts of a water-based foaming agent;

from 0.3 to 2 parts of a suitable surfactant adapted to allow the mutual miscibility between said at least one polyol and the isocyanate compound.

In the following description and in the appended claims, the term: "hydroxyl number" is used to indicate the concentration of hydroxyl groups reactive with the isocyanate groups per unit weigh of the polyol and measured as mg KOH/g, according to standards ASTM D 1638.

For the purposes of the invention, the polyester polyol is preferably selected from aromatic polyols having a molecular weight of from 150 to 1600, such as for instance those prepared starting from byproducts originating from the production of terephthalates.

Among them, suitable polyester polyols are those having the following structural formula:

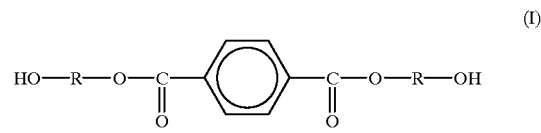

(I)

wherein R is an alkyl group, either linear or branched, having 1 to 5 carbon atoms.

In the formulations of rigid polyurethane foam of the invention, the polyester polyol having a functionality equal to 3 and a hydroxyl number of from 400 to 600, and preferably equal to about 500, performs an advantageous plasticizing effect on the foam being formed, particularly useful in continuous and spray applications.

A similar effect is obtained thanks to the polyester polyol having a functionality equal to 3 and a hydroxyl number of from 300 to 400, and preferably equal to about 350, both in continuous and spray applications and in those with batch forming processes.

In the formulations of rigid polyurethane foam of the invention, the polyester polyol having a functionality equal to 4 and a hydroxyl number of from 300 to 400, and preferably equal to about 350, instead, advantageously allows to obtain a rapid cross-linking kinetics in the starting forming steps, quickly imparting to the foam being formed a three-dimensional structure, while having a not excessive final rigidity. Such a feature is particularly useful in spray forming operations.

In the formulations of rigid polyurethane foam of the invention, the polyester polyol having a functionality equal to 5 and a hydroxyl number of from 450 to 550, and preferably equal to about 520, advantageously allows to impart to the foam being formed suitable properties of foam flowability and consistency, which are particularly useful in batch forming operations.

From experimental tests carried out by the Applicant it was found that by using said polyester polyol in the amounts indicated above, it is advantageously possible both to reduce the rigidity and, consequently, the friability of the polyurethane foam produced by using a water-based foaming agent and an isocyanate compound, and to obtain an improved fire resistance of said foam.

For the purposes of the invention, the isocyanate compound is preferably methylene diisocyanate-based and in particular it is essentially constituted by the so-called polymeric MDI or "crude MDI". The latter is essentially constituted by a blend of methylene diisocyanate and several oligomers thereof, that may be represented by the following structural formula:

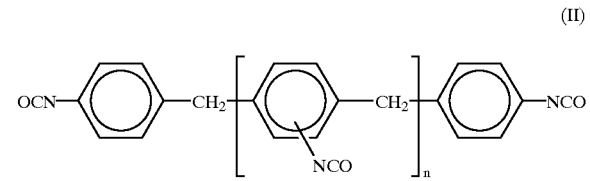

(II)

wherein n is an integer from 0 to 7.

Preferably, the polymeric MDI comprises from 40 to 55% of methylene diisocyanate (n=0), from 15 to 30% of oligomer wherein n=1, and from 15 to 40% of oligomers wherein n is an integer from 2 to 7.

To obtain the rigid polyurethane foams of the invention, an excess of polymeric MDI is preferably employed with respect to the stoichiometric amount. More particularly, the ratio between the isocyanate amount employed and the stoichiometrically calculated isocyanate amount or "isocyanate index" is higher than 1.1 (or 110 expressed in percent terms), and more preferably, higher than 1.2 (120).

Thanks to this feature, the Applicant observed an advantageous improvement in the characteristics of fire resistance and dimensional stability of the polyurethane foam, thanks to the fact that a more compact and resistant closed cell three-dimensional structure is obtained.

In a preferred embodiment, the aforementioned isocyanate index is of from 1.1 (110) to 1.5 (150), more preferably of from 1.2 (120) to 1.5 (150) and still more preferably, of from 1.4 (140) to 1.5 (150).

Preferably, the polymeric MDI of the invention further possesses a content of NCO isocyanate groups, expressed as parts by weight with respect to the overall molecular weight thereof, of from 30% to 32%.

For the purposes of the invention, the water-based foaming agent of preferred use is water or any other aqueous solution suitable for the intended purpose.

According to the invention and as will be more apparent in the following, the particular combination of the starting ingredients has surprisingly allowed the Applicant to formulate a rigid expanded polyurethane foam employing water as foaming agent having good heat insulating properties, good mechanical characteristics, good characteristics of dimensional stability on temperature changes and especially those characteristics of high adhesion to a supporting substrate which had not been achieved till now by the water-based foaming agents of the prior art.

For the purposes of the invention, the aforementioned surfactant may be selected from any compound having a polar character and adapted to allow the mutual miscibility between the polyol and the isocyanate compound.

Preferably, the surfactant is selected from silicon-based surfactants including aliphatic or aromatic chains, such as for instance poly (dimethylsiloxanes) (PDMS) and poly (phenylmethylsiloxanes) having a viscosity of from about 200 to about 14000 mPa*s at 25° C. and, still more preferably, of from about 2000 to about 5000 mPa*s at 25° C.

Among them, silicon surfactants of preferred use are those having the following structural formula:

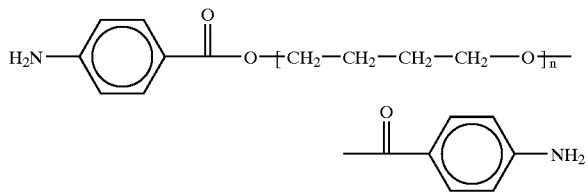

(III)

wherein x and y are integers of from 0 to 70 and wherein R is a polyether group having the following structural formula:

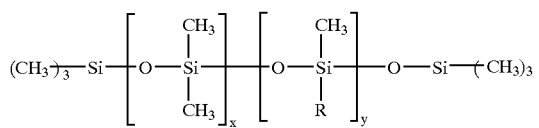

(IV)

wherein m and n are integers of from 1 to 10.

In the formulations of rigid polyurethane foam of the invention, the surfactant performs the double function of reducing the interface tension between the polyol and the isocyanate compound, that would not be miscible per se with each other, therefore allowing to carry out the desired reaction, and of stabilizing the cellular structure of the foam being formed, until the polyurethane three-dimensional lattice does not reach a cross-linking level and, along therewith, a stability sufficient for self-sustaining.

Advantageously, the surfactant also contributes in this way to achieve the desired structural uniformity of the foam, which is essentially constituted by closed cells.

Preferably, the surfactant is employed in an amount of from 0.5 to 1.5 parts by weight per each 100 parts of the aforesaid mixture of ingredients.

In a preferred embodiment, the rigid polyurethane foam of the invention is obtained starting from a mixture of ingredients further comprising from 0.1 to 4 parts of a polyamine, in particular a polytetramethyleneglycol-based (PTMEG) diamine having an equivalent weight of from 425 to 625 and a viscosity at 25° C. of from 2500 to 5000 mPa*s.

For the purposes of the invention, a diamine of preferred and advantageous use has the following structural formula:

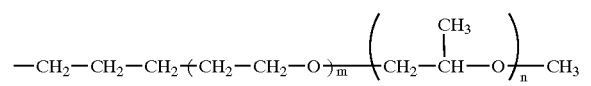

wherein n is an integer of from 1 to 20 and preferably of from 4 to 6.

The Applicant has surprisingly found that by using the aforesaid polyamines, the adhesion properties of the foam to the supporting substrate are markedly improved, so as to render the control of the process parameters (such as for instance the temperature of the reactants and/or of the same supporting substrate) to be less critical during the reactants feeding and foaming steps.

In particular, the Applicant has surprisingly found that by using such polyamines, the adhesion characteristics of the polyurethane foam to the substrate are markedly higher than those that could be obtained till now by the prior art by utilizing the conventional polyurethane formulations and water as foaming agent.

This advantageously allows to produce a building element coated with or incorporating an expanded polyurethane foam, using water as foaming agent also for all those applications wherein the control of the process parameters is difficult or even impossible, such as for instance in outdoor spray applications performed in situ.

In a further embodiment of the invention, the rigid polyurethane foam is obtained starting from a mixture of ingredients further comprising from 3 to 20 parts of at least one polyether polyol having a minimum functionality equal to 2 and a hydroxyl number of from 150 to 600.

For the purposes of the invention, the polyether polyol is preferably selected from aliphatic or aromatic polyols having a molecular weight of from 150 to 1600, and is conventionally prepared starting from an initiator having at least two acid hydrogen atoms and a chain extender, generally ethylene oxide or propylene oxide.

Among them, suitable polyether polyols are those having the following structural formulae:

$$R-O-(CH_2-CH_2-O)_n-CH_2-CH_2-OH \quad (VI)$$

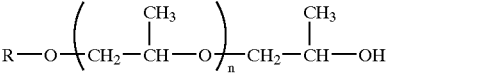

(VII)

wherein n is an integer of from 1 to 20.

Preferably, the polyether polyol has an average functionality of from 3 to 8 and rather short chains, and is obtained starting from a chain initiator selected from glycerol, trimethylolpropane, triethanolamine, pentaerythrite, ethylenediamine, toluenediamine, sorbitol, sucrose, and Mannich bases.

In the formulations of rigid polyurethane foams of the invention, and as will be more apparent in the following, the polyether polyol performs—according to its own hydroxyl number—the following functions:

i) allowing a rapid cross-linking of the foam without jeopardizing the final mechanical characteristics and adjusting the final viscosity of the mixture in continuous applications, ii) adjusting the rheologic characteristics of the mixture of ingredients (flowability) so as to reduce the formation of crusts or internal cavities and the cross-linking time in batch applications, and lastly iii) contributing to reach the required dimensional stability of the polyurethane foam on the temperature changes required for the different applications.

In the formulations of rigid polyurethane foam of the invention, the polyether polyol having a functionality equal to 3 and a hydroxyl number of from 100 to 230, and preferably equal to about 160, performs an advantageous fluidizing effect on the foam being formed, which is particularly useful in continuous, batch and spray applications.

In a further embodiment of the invention and if particular fire resistance properties are required, such as for instance in the case of heat insulating panels for heat ventilation or conditioning ducts, the rigid polyurethane foam is obtained starting from a mixture of ingredients further comprising from 5 to 10 parts of at least one halogenated or phosphorated polyol having a minimum functionality equal to 2 and a hydroxyl number of from 200 to 400 and, still more preferably, of from 250 to 300.

For the purposes of the invention, the halogenated polyol of preferred use is selected from brominated polyols, has a viscosity at 25° C. of from 3000 to 11000 mPa*s, still more preferably, of from 4000 to 6000 mPa*s and has an average functionality of from 2 to 4.

Advantageously and thanks to this low functionality, the brominated polyols of preferred use contribute to maintain the plasticity and processability of the polyurethane foam within the desired limits.

If the fire resistance requirements are particularly strict, it is preferable and advantageous to add to the starting mixture of ingredients from 4 to 10 parts of a suitable flame retardant agent.

For the purposes of the invention, the flame retardant is preferably selected from chlorinated phosphoric esters, such as for instance tris(2-chloropropyl) phosphate; tris (2-chloroethyl) phosphate; tris(2,3-dichloropropyl) phosphate; tetrakis(2-chloroethyl)-2,2-bis-(chloromethyl) propylene phosphate; dimethylmethylphosphonate; tris (polyoxyalkyleneglycol)phosphonate and tris (polyoxyalkyleneglycol)phosphite esters; tris(halopolyol) phosphonates; dibromoneopentyl glycol; polyesters and polyethers brominated diols; tetrabromobisphenol A; tetrabromophthalic anhydride; ammonium salts; aluminum hydroxide; melamine; calcium carbonate, and mixtures thereof.

Preferably, the flame retardant agent is selected from those having a decomposition temperature higher than 150° C., such as for instance tris(2-chloropropyl)phosphate or tris(2,3-dichloropropyl)phosphate.

Independently of the latter feature, the flame retardant agent advantageously contributes to reduce the viscosity of the mixture of ingredients by adjusting the final plasticization level, without jeopardizing the dimensional stability of the polyurethane foam produced.

In a preferred embodiment of the invention and both to accelerate the different reactions which take place in the formation of the polyurethane foam, and to balance such reactions with one another so as to obtain a foam having the desired characteristics, the mixture of starting ingredients further comprises from 0 to 3 parts of at least one catalyst selected from suitable foaming, polymerization and trimerization catalysts.

Within the ambit of the present invention, the term: foaming catalysts, is used to indicate catalysts which are active in the water/isocyanate reaction; they are preferably selected from aliphatic or cycloaliphatic tertiary amines, aliphatic or cycloaliphatic ether-amines, and mixtures thereof.

Within the ambit of the present invention, the term: polymerization catalysts, is used to indicate catalysts which are active in the isocyanate/polyol reaction; they are preferably selected from aliphatic or cycloaliphatic tertiary amines, $Sn^{++}$ salts, and mixtures thereof.

Within the ambit of the present invention, the term: trimerization catalysts, is used to indicate catalysts which are active in the trimerization reaction of isocyanate to from isocyanurate which, thanks to the high resonance of its isocyanuric ring, advantageously imparts to the final polyurethane foam an improved mechanical and temperature resistance, as well as improved fire resistance characteristics.

The trimerization catalysts of preferred use are selected from aliphatic or cycloaliphatic tertiary amines, fatty acid alkaline salts, and mixtures thereof.

Among the tertiary amines of preferred use, it is possible to mention, only by way of example, those selected from N,N-dimethylaminoethanol; N,N-dimethylcyclohexylamine; bis-(2-dimethylaminoethyl) ether; N,N,N',N',N''-pentamethyl-diethylene-triamine; N,N-dimethylbenzylamine; N,N-dimethylcetylamine; diaminobicyclooctane (DABCO), N-ethylmorpholine; methylene-bis-dimethylcyclohexylamine, N,N,N',N'',N''-pentamethyl-dipropylene-triamine; N,N'-diethylpiperazine; N,N,N'-trimethylaminoethyl-ethanolamine; 1-(2-hydroxypropyl)imidazole; 1,4-bis(2-hydroxypropyl)-2-methylpiperazine.

In addition to the above described ingredients, the starting mixture for the production of the polyurethane foam of the invention may incorporate other possible non-cross-linking agents, known per se, such as for instance reinforcing fillers or coloring agents, adapted to impart the desired characteristics to the polyurethane foam.

Besides, each of such ingredients is selected in amounts and according to ratios that can be easily determined by those skilled in the art.

By way of non-limitative indication, Table I, given below, shows as many compositions of the mixture of ingredients that may be used to obtain a typical polyurethane foam of the invention, according to the type of coating process, namely continuous, batch or spray.

In said Table, the parts are by weight, unless otherwise indicated.

In a preferred embodiment of the rigid polyurethane foam of the invention and within the field of continuous coating processes, excellent production speeds of composite panels have been achieved, without the need of modifying the existing plants, using a mixture of ingredients comprising per 100 parts by weight thereof:

from 15 to 25 parts of at least one polyester polyol having a minimum functionality equal to 2 and a hydroxyl number of from 350 to 520, and more preferably of from 350 to 500;

from 55 to 65 parts of at least one isocyanate compound having a minimum index equal to 1.2 (120);

from 4 to 8 parts of a brominated polyol;

from 1 to 3 parts of one of the aforesaid polyamines;

from 1.4 to 2 parts of water;

0.7 parts of a silicon-based surfactant.

Still more preferably, the rigid polyurethane foam may be obtained for such application by submitting to reaction and simultaneously foaming a mixture of ingredients comprising per 100 parts by weight thereof:
- from 9 to 12 parts of at least one polyester polyol having a functionality equal to 3 and a hydroxyl number of about 500;
- 7 parts of at least one polyester polyol having a functionality equal to 3 and a hydroxyl number of about 350.

Preferably, the aforesaid isocyanate compound is of the "crude MDI" type and has an isocyanate index of from 1.4 (140) to 1.5 (150).

Preferably, the aforesaid mixture of ingredients comprises 6 parts by weight of brominated polyol per 100 parts by weight thereof.

Preferably and in order to further improve the adhesion characteristics of the polyurethane foam to its substrate, it may be advantageously used per 100 parts by weight of the mixture up to 8 parts by weight of a polyether polyol, and preferably 6 parts by weight of a polyether polyol having a hydroxyl number equal to 160; and possibly at least one catalyst in a maximum amount equal to 1 part by weight.

Preferably and if at least one catalyst is present, the aforesaid mixture of ingredients may comprise:
- from 0 to 1 part of amine-based catalyst which is active in the isocyanate/water reaction (foaming catalyst); and/or
- from 0 to 1 part of amine-based catalyst which is active in the isocyanate/polyol reaction (polymerization catalyst); and/or
- from 0.5 to 1.5 part of a catalyst which is active in the isocyanate trimerization reaction (trimerization catalyst).

In order to further improve the characteristics of fire resistance of the polyurethane foam, it may be advantageously used as an additional ingredient a flame retardant agent in a maximum amount equal to 8 parts by weight and preferably equal to about 7 parts by weight per 100 parts by weight of the mixture.

According to a further aspect of the invention, it is provided at least one heat insulating building element comprising at least one supporting substrate coupled to the above described rigid polyurethane foam.

Heat insulating building elements incorporating or coated with such foam comprise, for instance, composite panels for manufacturing ducts for heat ventilation and conditioning plants, curtain walls and elements for manufacturing civil or industrial roofings of the type used for buildings, heat insulating elements, such as for instance walls for cold-storage benches or rooms, or the same walls of civil or industrial constructions, suitably coated with said foam.

In an embodiment, the building element of the invention comprises a composite structure substantially of the sandwich type, including a couple of supporting substrates between which the rigid polyurethane foam is interposed.

The modular walls for manufacturing ducts for heat ventilation or conditioning plants are a preferred example of such a sandwich-type building element.

Said supporting substrate may be selected from rigid or flexible sheets made of metal, concrete layers, bricks, wood and plasterboard panels, and the like, according to the specific application, the forming methods and the building element to be manufactured.

If the building element comprises a polyurethane foam layer associated with only one substrate support, such as for instance in spray application in the building field, it is preferred and advantageous to apply a protective film on the side of the rigid polyurethane foam opposite to the supporting substrate thereof, so as to protect the foam from weathering.

According to a further aspect of the invention, it is provided a process for producing a heat insulating building element comprising at least one supporting substrate in the form of a plate, sheet or panel coupled to a rigid polyurethane foam, comprising the steps of:
a) providing a supporting substrate in the form of plate, sheet or panel;
b) feeding on the supporting substrate a dosed amount of a mixture of ingredients according to what has been described above;
c) submitting to cross-linking and simultaneous foaming the mixture of ingredients, so as to obtain a rigid polyurethane foam coupled to the substrate.

Preferably, the process of the invention further comprises the step of applying on the supporting substrate a tackifying layer (primer), before carrying out the ingredient mixture feeding step.

Preferably, said primer is constituted by conventional epoxy or polyester resins, and has the function of improving the adhesion characteristics between the polyurethane foam and the same substrate.

In an embodiment, the process of the invention further comprises the step of coupling in step c) a coating substrate to the rigid polyurethane foam being formed, so as to obtain a building element comprising a composite structure substantially of the sandwich type, such as for instance a panel for manufacturing ducts for heat ventilation or conditioning plants.

In order to increase the production potentiality of the plants and to reduce costs, steps a)–c) of the process of the invention may be carried out in continuous with methods and apparatuses known per se.

In a preferred embodiment, the continuous process may be carried out by using a delivering device of previously dosed and mixed ingredients—known in the art by the term of "foamer"—which may be of both the low pressure type, meaning with this term a pressure of from 0 to 15 bar, and of the high pressure type, meaning with this term a pressure of from 100 to 200 bar.

In either case, the temperature of the mixture of ingredients is preferably of from 20° to 28° C., while the supporting substrate or the coating is preferably maintained at a temperature of from 35° to 45° C.

Advantageously, thanks to the use of the above described mixture of ingredients, it is possible to achieve high production speeds of composite building elements without having to modify the existing plants, reducing thereby the production costs.

In a further embodiment, the process for producing a heat insulating building element comprising a composite structure substantially of the sandwich type, including a couple of supporting substrates between which a rigid polyurethane foam is interposed, may be carried out batchwise and comprises the steps of:
a) providing in a forming apparatus and in mutually spaced relationship a couple of supporting substrates in the form of plate, sheet or panel;
b) feeding in the forming apparatus and between the couple of substrates a dosed amount of a mixture of ingredients according to what has been described above;
c) submitting to cross-linking and simultaneous foaming the mixture of ingredients, so as to obtain a rigid polyurethane foam interposed between the couple of substrates.

For the purposes of the invention, said method for batchwise production of a heat insulating building element may be carried out by using any forming apparatus suitable for the purpose, such as for instance a mold wherein a fixed forming chamber is defined having a prefixed size which corresponds to those of the element to be manufactured, or a press provided with a forming chamber having a variable size according to the element to be manufactured.

Also in this case, the process preferably comprises the further step of applying on at least one substrate of the couple a tackifying layer (primer), before carrying out said step b).

In a preferred embodiment, the batch process may be carried out by using a feeding device of previously dosed and mixed ingredients which may be of both the low pressure type, meaning with this term a pressure of from 0 to 15 bar, and of the high pressure type, meaning with this term a pressure of from 100 to 200 bar.

In either case, the temperature of the mixture of ingredients is preferably of from 20° to 25° C., while the supporting substrate or the coating is preferably maintained at a temperature of from 35° to 45° C.

In a further embodiment, the process for producing a heat insulating building element comprising a supporting substrate coupled to a rigid polyurethane foam may be carried out by spray-coating the mixture of cross-linking ingredients and comprises the steps of:

a) spraying on said supporting substrate a dosed amount of a mixture of ingredients according to what has been described above;

b) submitting to cross-linking and simultaneous foaming the mixture of ingredients, so as to obtain a rigid polyurethane foam coupled to the substrate.

Preferably, the process of the invention comprises in this case the further step of applying on the rigid polyurethane foam a protective film at a side opposite to the supporting substrate, so as to obtain said advantageous weathering protection effect in all those applications wherein the polyurethane foam is exposed to air.

Lastly, also in this case, the process preferably comprises the further step of applying on the supporting layer a tackifying layer (primer) before carrying out said step b).

In a preferred embodiment of the invention, the spray process may be carried out by using a foamer which may be of both the low pressure type, meaning with this term a pressure of from 0 to 15 bar, and the high pressure type, meaning with this term a pressure of from 60 to 200 bar.

In either case, the temperature of the mixture of ingredients is preferably of from 30° to 70° C., while the temperature of the supporting substrate may range—depending upon environmental conditions—from a minimum temperature of 5° C. to a maximum temperature of 45° C.

Said forming processes of the polyurethane foam of the invention carried out according to the continuous, batch or spray methods to give more complex composite heat insulating products may be carried out by means of apparatuses known per se, such as for instance those described by George Woods, "The ICI Polyurethanes Book", Second Edition, ICI Polyurethanes and John Wiley & Sons, 1990.

According to a further aspect of the invention and in order to make the polyurethane foam forming process easier, it is lastly provided a liquid catalytic composition for producing a rigid polyurethane foam comprising:

at least one liquid carrier, selected from polyester polyols, polyether polyols, halogenated or phosphorated polyols and flame retardant agents and having a viscosity at 25° C. of from 10 to 300 mPa*s;

a diamine having the formula

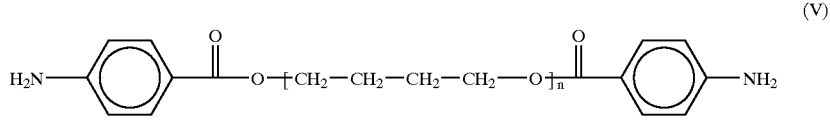

(V)

wherein n is an integer of from 1 to 20;

at least one catalyst selected from suitable foaming, polymerization and trimerization catalysts.

In a preferred embodiment, said polyester polyols, polyether polyols, halogenated and phosphorated polyols, flame retardant agents and catalysts are those already described above.

Advantageously, such liquid catalytic composition allows to obtain a useful intermediate product usable in any forming process, which allows to pre-dose some ingredients of the reaction mixture, making both the dosing operations thereof and the foaming and cross-linking operations of the foam easier.

Besides, thanks to the presence of said diamine, the catalytic composition of the invention advantageously allows to improve the adhesion properties of the foam to its supporting substrate and to render less critical the control of the process parameters during the steps of feeding and foaming of the reactants.

For the purposes of the invention, the liquid catalytic composition preferably comprises the amounts of the various ingredients shown in Table II, below.

Within the ranges of values shown in said Table II, it is preferred and advantageous to use the ingredients of the catalytic composition in the amounts indicated in the following table.

| | APPLICATION PROCESS | | |
|---|---|---|---|
| Ingredient | CONTINUOUS | BATCH | SPRAY |
| Carrier | 78–82 | 74–78 | 50–54 |
| Polyamine | 13–18 | 18–22 | 22–28 |
| Total catalysts | 4–6 | 2–4 | 20–25 |
| Foaming catalyst | 0.1–0.3 | 0.6–1.0 | 4–8 |
| Polymerization catalyst | 2.0–2.5 | 1.0–1.5 | 8.0–9.0 |
| Trimerization catalyst | 2.0–2.5 | 1.8–2.2 | 8.5–9.0 |

Further characteristics and advantages of the invention will be more readily apparent by the following examples of polyurethane foams according to the invention, solely given by way of non limitative indication. In the examples, the parts of the various ingredients are expressed as parts by weight, unless otherwise indicated.

EXAMPLE 1

Invention

A first heat insulating building element constituted by a composite panel having a sandwich structure essentially constituted by two sheets of centesimal aluminum with an interposed layer of polyurethane foam was prepared with a continuous process.

The reaction mixture used comprised the following ingredients:

polyester polyol with an average functionality equal to 3 and a hydroxyl number of from 400 to 600, available on the market under the trade name of ISOEXTER™ (C.O.I.M. S.p.A., Settimo Milanese, Milan, Italy);

polyester polyol with an average functionality equal to 3 and a hydroxyl number of from 300 to 400, available on the market under the trade name of ISOEXTER™ (C.O.I.M. S.p.A.);

polyether polyol with an average functionality equal to 3 and a hydroxyl number of from 100 to 300, available on the market under the trade name of TERCAROL™ (ENICHEM S.p.A., Milan, Italy);

brominated polyol with an average functionality equal to 2 and a hydroxyl number of from 250 to 300, available on the market under the trade name of AROFLAM™ (ENICHEM S.p.A.);

foaming agent=water;

flame retardant agent=trichloropropylphosphate (TCPP) available on the market;

silicon-based surfactant=DABCO DC 193 (AIR PRODUCTS, Allentown, Pa., U.S.A.);

foaming catalyst=N,N,N',N',N"-pentamethyl-diethylene-triamine, available on the market under the trade name of POLYCAT™ 5 (AIR PRODUCTS);

polymerization catalyst=N,N-dimethylcyclohexylamine, available on the market under the trade name of POLY-CAT™ 8 (AIR PRODUCTS);

trimerization catalyst=available on the market under the trade name of CATALIST LB (ICI ITALIA, Ternate, Italy);

diamine having the formula (V) described above and available on the market;

isocyanate compound=polymeric MDI available on the market under the trade name of SUPRASEC (ICI ITALIA).

Such mixture was fed to and distributed on a first sheet made of embossed centesimal aluminum having a thickness of about 80 μm by means of a foamer conventional per se, marketed by AFROS CANNON (Caronno Pertusella, Varese, Italy).

During the dosing step, the ingredients were maintained and fed at a temperature of about 25° C.

After dosing the ingredients a reaction/foaming step of the foam inside a rolling mill comprising two lower and respectively, upper conveyor belts, arranged parallel to each other was carried out using conventional methods and apparatuses.

Afterwards, a second aluminum sheet, intended to constitute the upper coating of the composite panel and identical to the preceding one, was fed in a way known per se to the rolling mill.

During the step of forming/foaming of the polyurethane foam, the conveyor belts were maintained at a temperature of about 40° C., while their traveling speed was so adjusted as to have an overall residence time of the foam being formed/foamed inside the rolling mill equal to about 3 minutes.

Besides, the distance between the two conveyor belts was so adjusted as to have a final thickness of the composite panel so produced equal to about 2 cm.

At the outlet of the forming tunnel, a substantially continuous composite panel was obtained which was cut with a cutting device conventional per se, obtaining panels which were subsequently stored.

The composition of the mixture of ingredients used to obtain the foam is shown in Table III, below.

EXAMPLE 2

Invention

A second heat insulating building element constituted by a composite panel having a sandwich structure essentially constituted by two steel plate sheets having an interposed layer of polyurethane foam was prepared with a batch process.

The reaction mixture used comprised the following ingredients:

polyester polyol having an average functionality equal to 3 and a hydroxyl number of from 300 to 400, available on the market under the trade name of ISOEXTER™ (C.O.I.M. S.p.A.);

polyether polyol with an average functionality equal to 5 and a hydroxyl number of from 450 to 550, available on the market under the trade name of CARADOL™ 520 (SHELL ITALIA, Milan, Italy);

polyether polyol with an average functionality equal to 3 and a hydroxyl number of from 100 to 300, available on the market under the trade name of TERCAROL™ 1 (ENICHEM S.p.A.);

foaming agent=water;

flame retardant agent=trichloropropylphosphate (TCPP) available on the market;

silicon-based surfactant=DABCO DC 193 (AIR PRODUCTS);

foaming catalyst=N,N,N',N',N"-pentamethyl-diethylene-triamine, available on the market under the trade name of POLYCAT™ 5 (AIR PRODUCTS);

trimerization catalyst=available on the market under the trade name of CATALIST LB (ICI ITALIA);

diamine having the formula (V) described above and available on the market;

isocyanate compounds=polymeric MDI available on the market under the trade name of SUPRASEC (ICI ITALIA).

Such mixture was fed to and distributed between a couple of steel plate sheets having a thickness of about 600 μm supported at a prefixed distance in a mold by means of a foamer conventional per se, marketed by Hennecke GmbH (Sankt Augustin, Germany).

During the dosing step, the ingredients were maintained and fed at a temperature of about 25° C.

After the dosing of the ingredients the reaction/foaming step of the foam was carried out inside a forming chamber defined within the mold and wherein the plate sheets were arranged parallel to each other at a distance of about 5 cm, so as to obtain a polyurethane foam layer of a corresponding thickness.

During the step of forming/foaming of the polyurethane foam, the sheets were maintained at a temperature of about 40° C., while the overall residence time of the foam being formed/foamed within the mold was equal to about 20 minutes.

The composition of the mixture of ingredients used to obtain the foam is shown in Table III, below.

EXAMPLE 3

Invention

A third heat insulating building element constituted by a roofing made of steel plate having a thickness of about 600

μm coated with a polyurethane foam layer was prepared by means of the spray process.

The reaction mixture used comprised the following ingredients:

polyester polyol with an average functionality equal to 3 and hydroxyl number of from 400 to 600, available on the market under the trade name of ISOEXTER™ (C.O.I.M. S.p.A.);

polyester polyol with an average functionality equal to 3 and a hydroxyl number of from 300 to 400, available on the market under the trade name of ISOEXTER™ (C.O.I.M. S.p.A.);

polyester polyol with an average functionality equal to 4 and a hydroxyl number of from 300 to 400, available on the market under the trade name of ISOEXTER™ (C.O.I.M. S.p.A.);

polyether polyol with an average functionality equal to 3 and a hydroxyl number of from 100 to 300, available on the market under the trade name of TERCAROL™ 1 (ENICHEM S.p.A.);

foaming agent=water;

flame retardant agent=trichloropropylphosphate (TCPP) available on the market;

silicon-based surfactant=DABCO DC 193 (AIR PRODUCTS, Allentown, Pa., U.S.A.);

foaming catalyst=N,N,N',N',N"-pentamethyl-diethylene-triamine, available on the market under the trade name of POLYCAT™ 5 (AIR PRODUCTS);

polymerization catalyst=N,N-dimethylcyclohexylamine, available on the market under the trade name of POLY-CAT™ 8 (AIR PRODUCTS);

trimerization catalyst=available on the market under the trade name of CATALIST LB (ICI ITALIA);

diamine having the formula (V) described above and available on the market;

isocyanate compounds=polymeric MDI available on the market under the trade name of SUPRASEC (ICI ITALIA).

Such mixture was first sprayed on the roofing by means of a foamer conventional per se and marketed by Gusmer (Lakewood, N.J., U.S.A.), and afterwards subjected to cross-linking and simultaneous foaming, obtaining a rigid polyurethane foam coupled to the substrate.

During the dosing step, the ingredients were maintained and fed at a temperature of about 30° C., corresponding to the temperature of the sheet whereon the ingredients were sprayed.

After dosing the ingredients the reaction/expansion step of the foam was carried out in free air and at ambient temperature (30° C.), obtaining a polyurethane foam layer having a thickness of about 4 cm.

The time necessary to complete the forming/foaming step was of about 1 minute.

The composition of the mixture of ingredients used to obtain the foam is shown in Table III, below.

EXAMPLES 4a–4c

Comparison

According to the methods and apparatuses described in preceding Example 1, three heat insulating building elements constituted by as many composite panels having a sandwich structure essentially constituted by two sheets of centesimal aluminum with an interposed layer of polyurethane foam entirely similar to the layer of element of Example 1 were prepared by a continuous process.

In this case, a mixture was used comprising the following ingredients:

polyether polyol with an average functionality equal to 4.5 and a hydroxyl number equal to 500, available on the market under the trade name of GLENDION™ RS 0700 (ENICHEM S.p.A.) [Examples 4a–4c];

polyether polyol with an average functionality equal to 5 and a hydroxyl number equal to 530, available on the market under the trade name of CARADOL™ 530 (SHELL ITALIA) [Examples 4a–4c];

polyether polyol with an average functionality equal to 3 and a hydroxyl number equal to 160, available on the market under the trade name of TERCAROL™ 1 (ENICHEM S.p.A.) [Example 4c];

flame retardant agents=trichloropropylphosphate (TCPP) available on the market [Examples 4a–4c];

cross-linking agent=glycerol, available on the market [Examples 4a and 4b];

silicon-based surfactant=DABCO DC 193 (AIR PRODUCTS) [Examples 4a–4c];

foaming catalyst=N,N,N',N',N"-pentamethyl-diethylene-triamine, available on the market under the trade name of POLYCAT™ 5 (AIR PRODUCTS) [Example 4c];

polymerization catalyst=N,N-dimethylcyclohexylamine, available on the market under the trade name of POLY-CAT™ 8 (AIR PRODUCTS) [Examples 4a and 4b];

trimerization catalyst=available on the market under the trade name of CATALIST LB (ICI ITALIA) [Examples 4a–4c];

isocyanate compound=polymeric MDI available on the market under the trade name of SUPRASEC (ICI ITALIA) [Examples 4a–4c].

The foaming agents used were respectively:

hydrochlorofluorocarbon, available on the market under the technical name of 141b [Example 4a];

n-pentane [Example 4b];

water [Example 4c].

In the formulations of Examples 4a and 4b, a small amount of water was used as an auxiliary foaming agent adapted to promote a rapid expansion of the foam The composition of the mixture of ingredients used to obtain the foam is shown in Table IV, below.

EXAMPLES 5a–5c

Comparison

According to the methods and the apparatuses described in the preceding Example 2, three heat insulating building elements constituted by as many composite panels having a sandwich structure essentially constituted by two steel plate sheets with an interposed polyurethane foam layer entirely similar to the layer of the element of Example 2 were prepared batchwise.

In this case, a mixture comprising the following ingredients was used:

polyether polyol with an average functionality equal to 4.5 and a hydroxyl number equal to 500, available on the market under the trade name of GLENDION™ RS 0700 (ENICHEM S.p.A.) [Examples 5a–5c];

polyether polyol with an average functionality equal to 3 and a hydroxyl number equal to 160, available on the market under the trade name of TERCAROL™ 1 (ENICHEM S.p.A.) [Examples 5a–5c];

flame retardant agent trichloropropylphosphate (TCPP) available on the market [Examples 5a–5c];

silicon-based surfactant=DABCO DC 193 (AIR PRODUCTS) [Examples 5a–5c];

foaming catalyst=N,N,N',N',N"-pentamethyl-diethylene-triamine, available on the market under the trade name of POLYCAT™ 5 (AIR PRODUCTS) [Example 5c];

polymerization catalyst=N,N-dimethylcyclohexylamine, available on the market under the trade name of POLY-CAT™ 8 (AIR PRODUCTS) [Examples 5a–5c];

isocyanate compound polymeric MDI available on the market under the trade name of SUPRASEC (ICI ITALIA) [Examples 5a–5c].

The foaming agents used were respectively:

hydrochlorofluorocarbon, available on the market under the technical name of 141b [Example 5a];

n-pentane [Example 5b];

water [Example 5c].

Also in this case, a small amount of water as an auxiliary foaming agent adapted to promote a rapid expansion of the foam was used in the formulations of Examples 5a and 5b.

The composition of the mixture of ingredients used to obtain the foams is shown in Table IV, below.

EXAMPLE 6

Comparison

According to the methods and the apparatuses described in the preceding Example 3, a heat insulating building element constituted by a steel plate coated with a polyurethane foam layer entirely similar to the layer of the element of Example 3 was prepared.

In this case, a mixture comprising the following ingredients was used:

polyether polyol with an average functionality equal to 5 and a hydroxyl number equal to 530, available on the market under the trade name of CARADOL™ 530 (SHELL ITALIA);

polyether polyol with an average functionality equal to 3 and a hydroxyl number equal to 160, available on the market under the trade name of TERCAROL™ 1 (ENICHEM S.p.A.);

polyester polyol with an average functionality equal to 2 and a hydroxyl number equal to 250, available on the market under the trade name of STEPANPOL™ 1 (STEPAN COMPANY, Illinois, U.S.A.);

flame retardant agent=trichloropropylphosphate (TCPP) available on the market;

cross-linking agent=glycerol, available on the market;

silicon-based surfactant=DABCO DC 193 (AIR PRODUCTS);

foaming catalyst=N,N,N',N',N"-pentamethyl-diethylene-triamine, available on the market under the trade name of POLYCAT™ 5 (AIR PRODUCTS);

polymerization catalyst=N,N-dimethylcyclohexylamine, available on the market under the trade name of POLY-CAT™ 8 (AIR PRODUCTS);

trimerization catalyst=available on the market under the trade name of CATALIST LB (ICI ITALIA);

isocyanate compound=polymeric MDI available on the market under the trade name of SUPRASEC (ICI ITALIA).

The foaming agent was hydrochlorofluorocarbon, available on the market under the technical name of 141b. Also in this case a small amount of water was used as an auxiliary foaming agent adapted to promote a rapid expansion of the foam.

The composition of the mixture of ingredients used to obtain the foam is shown in Table IV, below.

EXAMPLE 7

Determination of Foam Density

A sample of polyurethane foam of each of Examples 1–3 (invention), 4a–4c, 5a–5c and 6 (comparison) was submitted to a set of tests in order to determine the density at the foam core.

Said tests were carried out according to standard EN 1602.

The results of the tests carried out are shown in Tables V, VI and VII, below, for the products obtained by means of continuous (Examples 1, 4a–c), batch (Examples 2, 5a–c) and spray (Examples 3 and 6) forming processes.

An examination of said results shows that in the continuous as well as in the batch and the spray forming processes, the polyurethane foams of the invention (Examples 1–3) have higher core density values than the foams of the prior art (Examples 4a–4c, 5a–5c and 6).

EXAMPLE 8

Determination of the Conductivity Characteristics of the Foam

A sample of polyurethane foam of each of Examples 1–3 (invention), 4a–4c, 5a–5c and 6 (comparison) was submitted to a set of tests in order to determine the conductivity of the foam.

Said tests were carried out according to the standard UNI 7891.

The results of the tests carried out are shown in Tables V, VI and VII, below, for the products obtained by means of continuous (Examples 1, 4a–c), batch (Examples 2, 5a–c) and spray (Examples 3 and 6) forming processes.

An examination of said results shows that in the continuous as well as in the batch and the spray forming processes, the polyurethane foams of the invention (Examples 1–3) have conductivity values comparable to those of foams of the prior art (Examples 4a–4c, 5a–5c and 6).

EXAMPLE 9

Determination of the Dimensional Stability Characteristics of the Foam on Temperature Changes A sample of polyurethane foam of each of Examples 1–3 (invention), 4a–4c, 5a–5c and 6 (comparison) was submitted to a set of tests in order to determine the dimensional stability of the foam on temperature changes.

Said tests were carried out according to the standard EN 604.

The results of the tests carried out are shown in Tables V, VI and VII, below, for the products obtained by means of continuous (Examples 1, 4a–c), batch (Examples 2, 5a–c) and spray (Examples 3 and 6) forming processes.

An examination of said results shows that both in the continuous and in the batch forming processes, the polyurethane foams of the invention (Examples 1–2) have dimensional stability values of the foam at the temperature of −25° C. comparable to those of the foams of the prior art (Examples 4a–4c and 5a–5c); while at the temperature of 70° C. the polyurethane foams of the invention have markedly better values with respect to the polyurethane foam containing water as foaming agent (Examples 4c, 5c) and comparable values to those of the foams containing 141b and n-pentane as foaming agent (Examples 4a–4b and 5a–5b).

EXAMPLE 10

Determination of Fire Resistance Characteristics

A sample of polyurethane foam of each of Examples 1–3 (invention), 4a–4c, 5a–5c and 6 (comparison) was submitted to a set of tests in order to determine the characteristics of fire resistance thereof.

The rests were carried out according to the standard DIN 4102.

The results of the tests carried out are shown in Tables V, VI and VII, below, for the products obtained by means of continuous (Examples 1, 4a–c), batch (Examples 2, 5a–c) and spray (Examples 3 and 6) forming processes.

According to the aforesaid standard, the foams are subdivided into three classes, B1, B2 and B3, depending on reaction to fire shown during the tests. The foams that show the best results are those belonging to class B1, while those that show the worst results are those belonging to class B3.

An examination of said results shows that in the continuous as well as in the batch and spray forming processes, the polyurethane foams of the invention (Examples 1–3) have fire resistance values better than those of the polyurethane foams of the prior art (Examples 4a–4c, 5a–5c and 6).

In the case of the spray forming process, the polyurethane foam of the invention (Example 3) shows dimensional stability values comparable to the foam of the prior art (Example 6).

EXAMPLE 11

Determination of the Adhesion Characteristics of the Foam to its Supporting Substrate A sample of polyurethane foam of each of Examples 1–3 (invention), 4a–4c, 5a–5c and 6 (comparison) was submitted to a set of tests in order to determine the adhesion characteristics of the foam to its supporting substrate.

The tests were carried out according to the standard EN 1607.

The results of the tests carried out are shown in Tables V, VI and VII, below, for the products obtained by means of continuous (Examples 1, 4a–4c), batch (Examples 2, 5a–5c) and spray (Examples 3 and 6) forming processes.

An examination of said results shows that both in the continuous and in the batch forming processes, the polyurethane foams of the invention (Examples 1 and 2) have adhesion values to their substrates better than or comparable to the foams of the prior art (Examples 4–5), and particularly much better than the foams that contain water as foaming agent (Examples 4c and 5c).

In the case of the spray forming process, the polyurethane foam of the invention (Example 3) shows values of adhesion to its substrate comparable to the foam of the prior art (Example 6).

TABLE I

| | APPLICATION PROCESS | | |
|---|---|---|---|
| Ingredient | CONTINUOUS | BATCH | SPRAY |
| Polyester polyol F = 3 OH = 400–600 | 8–10 | — | 5–10 |
| Polyester polyol F = 3 OH = 300–400 | 6–10 | 10–20 | 10–15 |
| Polyester polyol F = 4 OH = 300–400 | — | — | 2–3 |
| Polyester polyol F = 5 OH = 450–550 | — | 5–10 | — |
| Polyester polyol F = 3 OH = 100–300 | 3–7 | 5–10 | 2–3 |
| Brominated polyol F = 2 OH = 250–300 | 6–10 | — | — |
| Water | 1–1.5 | 1.4–1.8 | 1.2–1.6 |
| Flame retardant agent | 4–10 | 6–10 | 5–10 |
| Silicon-based surfactant | 0.5–0.8 | 0.6–0.9 | 0.5–1 |
| Foaming catalyst | 0.02–0.1 | 0–0.1 | 0.3–1 |
| Polymerization catalyst | 0.1–0.2 | — | 0.3–1.5 |
| Trimerization catalyst | 0.1–0.4 | 0.05–0.2 | 0.3–1.5 |
| Polyamine | 0.1–2 | 1–3 | 1.5–4 |
| Isocyanate compound | 55–65 | 50–60 | 52–62 |

F = average functionality
OH = hydroxyl number [mgKOH/g]

TABLE II

| | APPLICATION PROCESS | | |
|---|---|---|---|
| Ingredient | CONTINUOUS | BATCH | SPRAY |
| Carrier | 70–90 | 70–80 | 45–70 |
| Polyamine | 10–20 | 15–30 | 20–30 |
| Total catalysts | 3–8 | 2–5 | 20–30 |
| Foaming catalyst | 0.1–0.5 | 0.5–1.0 | 3–10 |
| Polymerization catalyst | 1.8–3.0 | 0.8–2.0 | 6–15 |
| Trimerization catalyst | 1.5–3.0 | 1–3 | 6–12 |

TABLE III

| Ingredients | Ex. 1* | Ex. 2* | Ex. 3* |
|---|---|---|---|
| Polyester polyol F = 3 OH = 400–600 | 9 | — | 8 |
| Polyester polyol F = 3 OH = 300–400 | 7 | 15 | 13 |
| Polyester polyol F = 4 OH = 300–400 | — | — | 2.5 |
| Polyester polyol F = 5 OH = 450–550 | — | 9 | — |
| Polyester polyol F = 3 OH = 100–300 | 5 | 6 | 2.5 |
| Brominated polyol F = 2 OH = 250–300 | 7 | — | — |
| Water | 1.2 | 1.5 | 1.3 |
| Flame retardant agent | 9 | 9 | 8 |
| Silicon-based surfactant | 0.7 | 0.7 | 0.7 |
| Foaming catalyst | 0.05 | 0.07 | 0.7 |
| Polymerization catalyst | 0.15 | — | 1 |
| Trimerization catalyst | 0.3 | 0.1 | 1 |
| Polyamine | 1 | 1.5 | 3 |
| Isocyanate compound | 59.6 | 57.1 | 58.5 |

F = average functionality
OH = hydroxyl number [mgKOH/g]
*= invention

TABLE IV

| Ingredients | Ex. 4a** | Ex. 4b** | Ex. 4c** | Ex. 5a** | Ex. 5b** | Ex. 5c** | Ex. 6** |
|---|---|---|---|---|---|---|---|
| Polyether polyol F = 4.5 OH = 500 | 24 | 25 | 15 | 25 | 26.4 | 12.6 | — |
| Polyether polyol F = 5 OH = 530 | 6.0 | 6.3 | 6.1 | — | — | — | 12.5 |
| Polyether polyol F = 3 OH = 160 | — | — | 9.2 | 6.3 | 6.6 | 18.9 | 7.5 |
| Polyester polyol F = 2 OH = 250 | — | — | — | — | — | — | 5 |
| Water | 0.45 | 0.47 | 1.4 | 0.47 | 0.5 | 1.6 | 0.3 |
| n-pentane | — | 4.7 | — | — | 5.95 | — | — |
| 141b | 8.5 | — | — | 11 | — | — | 8.75 |
| Flame retardant agent | 4.5 | 4.7 | 9.2 | 6.3 | 6.6 | 9.4 | 12.5 |
| Cross-linking agent | 0.9 | 0.94 | — | — | — | — | 0.75 |
| Silicon-based surfactant | 0.6 | 0.62 | 0.61 | 0.6 | 0.66 | 0.6 | 0.5 |
| Foaming catalyst | — | — | 0.5 | — | — | 0.2 | 0.5 |
| Polymerization catalyst | 0.3 | 0.52 | — | 0.3 | 0.33 | 0.1 | 1.3 |
| Trimerization catalyst | 0.1 | 0.11 | 0.11 | — | — | — | 0.2 |
| Isocyanate compound | 54.5 | 56.6 | 57.9 | 50.0 | 53.0 | 56.6 | 50.2 |

F = average functionality
OH = hydroxyl number [mgKOH/g]
** = comparison

TABLE V

CONTINUOUS APPLICATION PROCESS

| Properties | Ex. 1* | Ex. 4a** | Ex. 4b** | Ex. 4c** |
|---|---|---|---|---|
| Density [kg/m³] | 40 | 35 | 35 | 33 |
| Conductivity [W/m °C.] | 0.025 | 0.020 | 0.025 | 0.027 |
| Dimensional stability | | | | |
| −25° C. [%] | 0.2 | 0.5 | 0.5 | 0.2 |
| +70° C. [%] | 2 | 3 | 3 | 10 |
| Fire reaction [DIN class] | B2 | B3/B2 | B3 | B3 |
| Adhesion [kg/cm²] | 1.2 | 1 | 1 | 0.1 |

*= invention
**= comparison

TABLE VI

BATCH APPLICATION PROCESS

| Properties | Ex. 2* | Ex. 5a** | Ex. 5b** | Ex. 5c** |
|---|---|---|---|---|
| Density [kg/m³] | 40 | 35 | 35 | 33 |
| Conductivity [W/m °C.] | 0.025 | 0.020 | 0.025 | 0.027 |
| Dimensional stability | | | | |
| −25° C. [%] | 0.5 | 1 | 1 | 0.5 |
| +70° C. [%] | 2 | 3 | 3 | 15 |
| Fire reaction [DIN class] | B2 | B3/B2 | B3 | B3 |
| Adhesion [kg/cm²] | 1.5 | 1.5 | 1.5 | 0.1 |

*= invention
**= comparison

TABLE VII

SPRAY APPLICATION PROCESS

| Properties | Ex. 3* | Ex. 6** |
|---|---|---|
| Density [kg/m³] | 40 | 35 |
| Conductivity [W/m °C.] | 0.025 | 0.020 |
| Dimensional stability | | |
| −25° C. [%] | 0.2 | 0.2 |
| +70° C. [%] | 2 | 2 |
| Fire reaction [DIN class] | B2 | B3 |
| Adhesion [kg/cm²] | 1 | 1 |

*= invention
**= comparison

What is claimed is:

1. A rigid polyurethane foam comprising a foamed structure consisting of closed cells substantially free therein of optionally halogenated hydrocarbon foaming agents, said polyurethane foam being obtained by using non-organic foaming agents from a mixture of ingredients including a water-based foaming agent, at least one polyol, and at least one diisocyanate compound;
   wherein said polyurethane foam has an adhesion strength to a supporting substrate, measured according to standards EN 1607, equal to or higher than 0.7 kg/cm²; and
   wherein said mixture of ingredients further comprises 0.1 to 4 parts by weight of a polyamine having the formula;

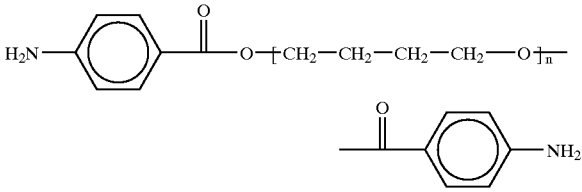

wherein n is an integer of from 1 to 20.

2. The polyurethane foam according to claim 1, having a percent linear dimensional variation, measured according to standards EN 1604, from a minimum temperature of −25° C. to a maximum temperature of 70° C., not higher than 4%.

3. The polyurethane foam according to claim 1, having a friability, measured as percent weight loss according to standards ASTM C421, not higher than 3%.

4. The polyurethane foam according to claim 1, having a heat conductivity, measured according to standards ISO 6902, of from 0.024 to 0.028 W/m° C.

5. The polyurethane foam according to claim 1, wherein said mixture of ingredients comprises per 100 parts by weight thereof:
   from 10 to 25 parts of at least one polyester polyol having a minimum functionality equal to 2 and a hydroxyl number of from 250 to 600;
   from 50 to 65 parts of at least one isocyanate compound;
   from 1 to 2 parts of a water-based foaming agent; and
   from 0.3 to 2 parts of a suitable surfactant adapted to allow the mutual miscibility between said at least one polyol and said at least one diisocyanate compound.

6. The polyurethane foam according to claims 1 or 5, wherein said mixture of ingredients further comprises from 3 to 20 parts of at least one polyether polyol having a minimum functionality equal to 2 and a hydroxyl number of from 150 to 550.

7. The polyurethane foam according to claims 1 or 5, wherein said mixture of ingredients further comprises from 5 to 10 parts of at least one halogenated or phosphorated polyol having a minimum functionality equal to 2 and a hydroxyl number of from 240 to 300.

8. The polyurethane foam according to claims 1 or 5, wherein said mixture of ingredients further comprises from 4 to 10 parts of a suitable flame retardant agent.

9. The polyurethane foam according to claims 1 or 5, wherein said mixture of ingredients further comprises from 0 to 3 parts of a catalyst selected from the group consisting of foaming, polymerization, and trimerization catalysts.

10. A process for producing a heat insulating building element, comprising at least one supporting substrate in the form of a plate, a sheet or a panel coupled to a rigid polyurethane foam, comprising the steps of:

a) providing a supporting substrate in the form of plate, sheet or panel;

b) feeding on said supporting substrate a dosed amount of a mixture of ingredients according to claim 5;

c) submitting to cross-linking and simultaneous foaming said mixture of ingredients, so as to obtain a rigid polyurethane foam coupled to said substrate.

11. The process according to claim 10, further comprising the step of applying on said rigid polyurethane foam a protective film on a side thereof opposite to the supporting substrate.

12. The process according to claim 10, further comprising the step of applying on said supporting substrate a primer before carrying out said feeding step.

13. The process according to claim 10, further comprising the step of coupling during said step c) a coating substrate to the rigid polyurethane foam being formed, obtaining a building element comprising a composite structure substantially of the sandwich type.

14. The process according to claim 10, wherein said steps a)–c) are carried out in continuous.

15. A process for the batch production of a heat insulating building element, comprising a composite structure substantially of the sandwich type, including a couple of supporting substrates between which a rigid polyurethane foam is interposed, comprising the steps of:

a) providing in a forming apparatus and in mutually spaced relationship a couple of supporting substrates in the form of plate, sheet or panel, b) feeding in said forming apparatus and between said couple of substrates a dosed amount of a mixture of ingredients according to claim 5;

c) submitting to cross-linking and simultaneous foaming said mixture of ingredients, so as to obtain a rigid polyurethane foam interposed between said couple of substrates.

16. The process according to claim 15, further comprising the step of applying on at least one substrate of said couple a primer before carrying out said step b).

17. A process for producing a heat insulating building element, comprising at least one supporting substrate coupled to a rigid polyurethane foam, comprising the steps of:

a) spraying on said supporting substrate a dosed amount of a mixture of ingredients according to claim 5;

b) submitting to cross-linking and simultaneous foaming said mixture of ingredients, so as to obtain a rigid polyurethane foam coupled to said substrate.

18. The process according to claim 17, further comprising the step of applying on said rigid polyurethane foam a protective film on a side thereof opposite to the supporting substrate.

19. The process according to claim 17, further comprising the step of applying on said supporting substrate a primer before carrying out said spraying step.

20. A heat insulating building element comprising at least one supporting substrate coupled to a rigid polyurethane foam according to claim 1.

21. The building element according to claim 20, comprising a composite structure substantially of the sandwich type, including a couple of supporting substrates between which said rigid polyurethane foam is interposed.

22. The building element according to claim 21, in the form of a modular wall for manufacturing ducts for conditioning plants.

23. The building element according to claim 20, wherein said supporting substrate is a rigid or flexible sheet made of a material selected from the group consisting of metal, concrete, brick, wood and plasterboard.

24. The building element according to claim 20, further comprising a protective film applied on the rigid polyurethane foam on a side thereof opposite to the supporting substrate.

25. A method for making a polyurethane foam, comprising the steps of:

simultaneously reacting and foaming a mixture comprising at least one polyol with at least one diisocyanate compound in the presence of a water-based foaming agent, and adding to said mixture 0.1 to 4 parts by weight of a polyamine having the formula

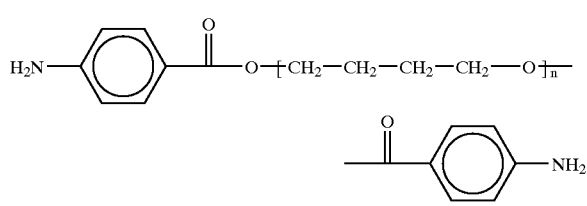

wherein n is an integer of from 1 to 20, and wherein said polyurethane foam comprises a foamed structure consisting of closed cells substantially free therein of optionally halogenated hydrocarbon foaming agents, said polyurethane foam having an adhesion to a supporting substrate, measured according to standards EN 1607, equal to or higher than 0.7 kg/cm$^2$.

* * * * *

UNITED STATES PATENT AND TRADEMARK OFFICE
CERTIFICATE OF CORRECTION

PATENT NO. : 6,808,800 B2
DATED : October 26, 2004
INVENTOR(S) : Giampaolo Tomasi It is certified that error appears in the above-identified patent and that said Letters Patent is hereby corrected as shown below:

<u>Title page,</u>
Item [73], Assignee, "Holdings" should read -- Holding --.

<u>Column 22,</u>
Line 31, "formula;" should read -- formula: --.
Line 33, please replace this formula:

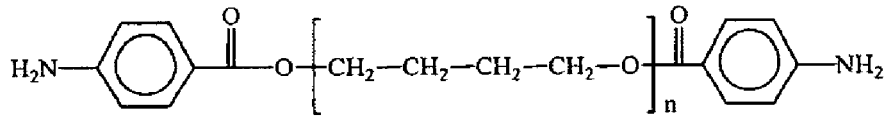

with this formula showing a -- (V) -- to the far right of the structure.

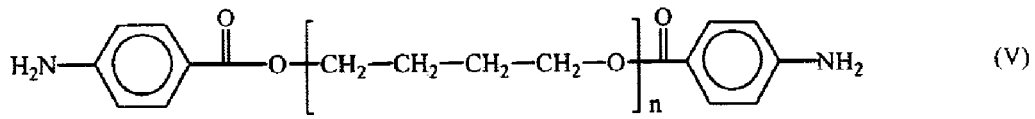

Line 58, "isocyanate" should read -- diisocyanate --.

<u>Column 23,</u>
Line 12, "catalysts." should read -- catalyst. --.

UNITED STATES PATENT AND TRADEMARK OFFICE
CERTIFICATE OF CORRECTION

PATENT NO. : 6,808,800 B2
DATED : October 26, 2004
INVENTOR(S) : Giampaolo Tomasi It is certified that error appears in the above-identified patent and that said Letters Patent is hereby corrected as shown below:

Column 24,
Line 41, please replace this formula:

with this formula showing a -- (V) -- to the right of the structure.

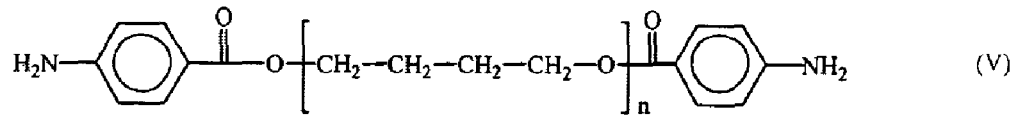

Signed and Sealed this

Twenty-second Day of February, 2005

JON W. DUDAS
*Director of the United States Patent and Trademark Office*